(12) United States Patent
Snyder et al.

(10) Patent No.: US 9,371,743 B2
(45) Date of Patent: Jun. 21, 2016

(54) CAP DRAIN PLUG

(71) Applicant: United Technologies Corporation, Hartford, CT (US)

(72) Inventors: Ryan K. Snyder, Glastonbury, CT (US); Kari L. Kisselbrack, Portland, CT (US); Curtis J. Ruckey, Windsor Locks, CT (US); Robert Howard, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 17 days.

(21) Appl. No.: 14/186,435

(22) Filed: Feb. 21, 2014

(65) Prior Publication Data
US 2014/0231437 A1   Aug. 21, 2014

Related U.S. Application Data

(60) Provisional application No. 61/767,543, filed on Feb. 21, 2013.

(51) Int. Cl.
| B65D 51/18 | (2006.01) |
| F01D 25/18 | (2006.01) |
| F01M 11/04 | (2006.01) |
| F16N 19/00 | (2006.01) |
| F01D 25/00 | (2006.01) |
| F16N 31/00 | (2006.01) |

(52) U.S. Cl.
CPC ............... *F01D 25/18* (2013.01); *F01D 25/00* (2013.01); *F01M 11/0458* (2013.01); *F16N 19/00* (2013.01); *F01M 2011/0491* (2013.01); *F05D 2260/98* (2013.01); *F16N 31/00* (2013.01)

(58) Field of Classification Search
CPC . Y10S 220/33; Y10S 292/40; B60K 15/0406; B60K 15/04; B60K 2015/0445; B60K 15/035; B60K 15/03519; B60K 15/05; B60K 2105/03448; B60K 2015/0461
USPC ......... 220/DIG. 33, 245, 314, 255, 86.2, 801; 49/465; 141/59, 301; 73/114, 38
See application file for complete search history.

(56) References Cited

U.S. PATENT DOCUMENTS

| 4,286,727 | A   |   | 9/1981  | Limoncelli |
| 4,519,519 | A   | * | 5/1985  | Meuschke et al. ............ 220/211 |
| 4,552,282 | A   |   | 11/1985 | Nishida |
| 4,739,892 | A   |   | 4/1988  | Tudek |
| 4,768,677 | A   |   | 9/1988  | Kitsukawa |
| 4,782,974 | A   |   | 11/1988 | Elkayam |
| 5,044,678 | A   | * | 9/1991  | Detweiler ..................... 292/144 |
| 5,234,122 | A   | * | 8/1993  | Cherng .......................... 220/211 |
| 5,823,748 | A   |   | 10/1998 | Benckert et al. |
| 6,093,231 | A   |   | 7/2000  | Read et al. |
| 6,234,555 | B1  | * | 5/2001  | Emmerich et al. ......... 296/97.22 |
| 6,234,557 | B1  | * | 5/2001  | Bae ............................. 296/97.22 |
| 6,478,056 | B1  |   | 11/2002 | Fitzpatrick |
| 6,575,131 | B2  | * | 6/2003  | Brister ...................... 123/198 D |
| 6,698,611 | B2  |   | 3/2004  | Matsubara et al. |
| 6,983,773 | B1  | * | 1/2006  | Hagano ................. B60K 15/04 141/348 |
| 6,983,814 | B2  |   | 1/2006  | Armstrong et al. |
| 7,959,026 | B2  |   | 6/2011  | Bertani |
| 8,042,705 | B2  | * | 10/2011 | Ligorio et al. ................ 220/582 |
| 8,291,608 | B2  |   | 10/2012 | Fogle |
| 2009/0314979 | A1 | * | 12/2009 | McIntire ....................... 251/334 |

* cited by examiner

*Primary Examiner* — Shawn M Braden
(74) *Attorney, Agent, or Firm* — O'Shea Getz P.C.

(57) ABSTRACT

A cap assembly includes a plunger mounted to a retainer pin and a latch operable to retract the retainer pin.

10 Claims, 5 Drawing Sheets

CAP DRAIN PLUG

This application claims priority to U.S. Patent Appln. No. 61/767,543 filed Feb. 21, 2013.

BACKGROUND

The present disclosure relates to a lubrication system for a gas turbine engine and, more particularly, to a cap for a tank thereof.

Aircraft gas turbine engines include a lubrication system to supply oil to various components. An oil tank is often mounted to an engine case within a nacelle. The oil tank typically includes a scupper and drain line to provide an efficient "fill to spill" maintenance operation.

Under certain conditions, a small delta pressure may exist across the drain line with respect to within the nacelle such that residual oil in the drain line may be purged back into the nacelle compartment as an oil mist. This may increase subsequent engine maintenance requirements and in some instances may potentially limn an undesirable combustion source.

SUMMARY

A cap assembly according to one disclosed non-limiting embodiment of the present disclosure includes a retainer pin for a cap. A plunger is mounted to the retainer pin and a latch operable to retract the retainer pin.

A further embodiment of the present disclosure includes, wherein the plunger is manufactured of resilient material.

A further embodiment of any of the foregoing embodiments of the present disclosure includes, wherein the plunger is frustroconical.

A further embodiment of any of the foregoing embodiments of the present disclosure includes, wherein the retainer pin is defined along an axis parallel to a hinge axis.

A further embodiment of any of the foregoing embodiments of the present disclosure includes, wherein the latch is spring loaded.

A tank for a gas turbine engine according to another disclosed non-limiting embodiment of the present disclosure includes a scupper bowl that surrounds a cap. An oil scupper drain line is connected to the scupper bowl at a fitting A retainer pin with a plunger, the retainer pin movable along an axis with respect to the cap, the plunger selectively received within the fitting to lock the cap and seal the oil scupper drain line.

A further embodiment of any of the foregoing embodiments of the present disclosure includes, wherein the tank is an oil tank.

A further embodiment of any of the foregoing embodiments of the present disclosure includes, wherein the cap is hinged to the tank along a hinge axis.

A further embodiment of any of the foregoing embodiments of the present disclosure includes, wherein the hinge axis is parallel to the retainer pin.

A method of locking a cap assembly of a gas turbine engine according to another disclosed non-limiting embodiment of the present disclosure includes sealing an oil scupper drain line.

A further embodiment of any of the foregoing embodiments of the present disclosure includes extending a retainer pin with a plunger into a fitting of the oil scupper drain line.

A further embodiment of any of the foregoing embodiments of the present disclosure includes sealing the plunger into a fitting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
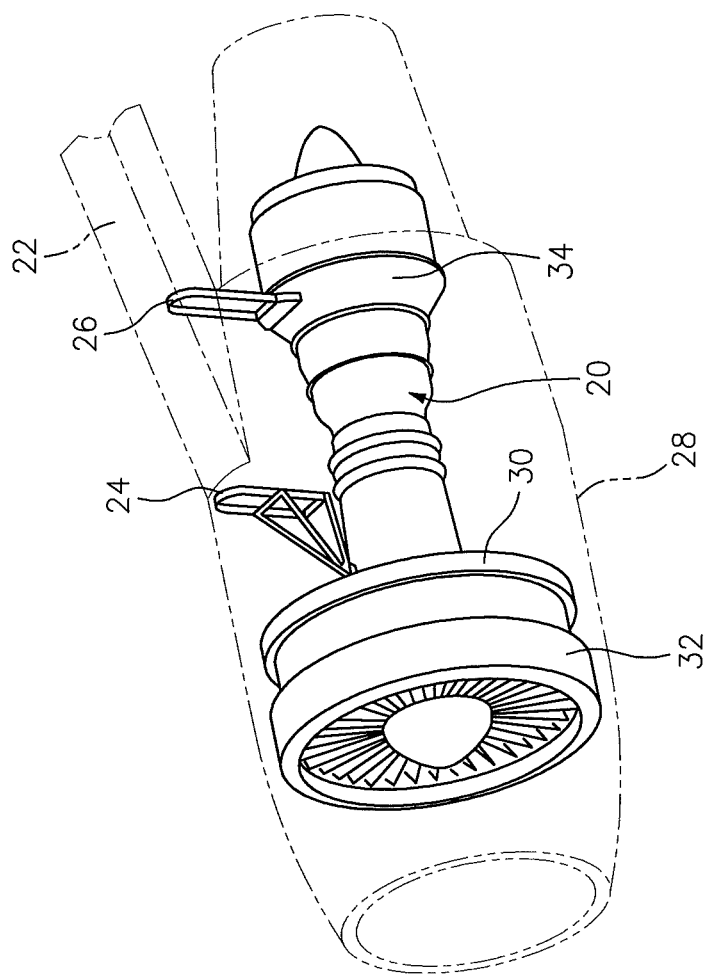
FIG. 1 is a general schematic partial fragmentary view of a gas turbine engine within a nacelle suspended from an engine pylon.

FIG. 1 schematically illustrates a gas turbine engine 20 suspended from an engine pylon 22 by a front mount 24 and an aft mount 26. The engine pylon 22 or other support structure is typically mounted to an aircraft wing, however, the engine pylon 22 may alternatively extend from other aircraft structure such as an aircraft empennage. The engine 20 is mounted within an engine nacelle assembly 28 as is typical of an aircraft designed for subsonic operation. The front mount 24 is attached to the engine 20 at an intermediate case 30 aft of a fan case 32. The aft mount 26 is attached to the engine 20 at a turbine case 34. It should be appreciated that the mount structure, case arrangement and nacelle assembly are schematically illustrated and various engine architectures will benefit herefrom.

Figure 2:
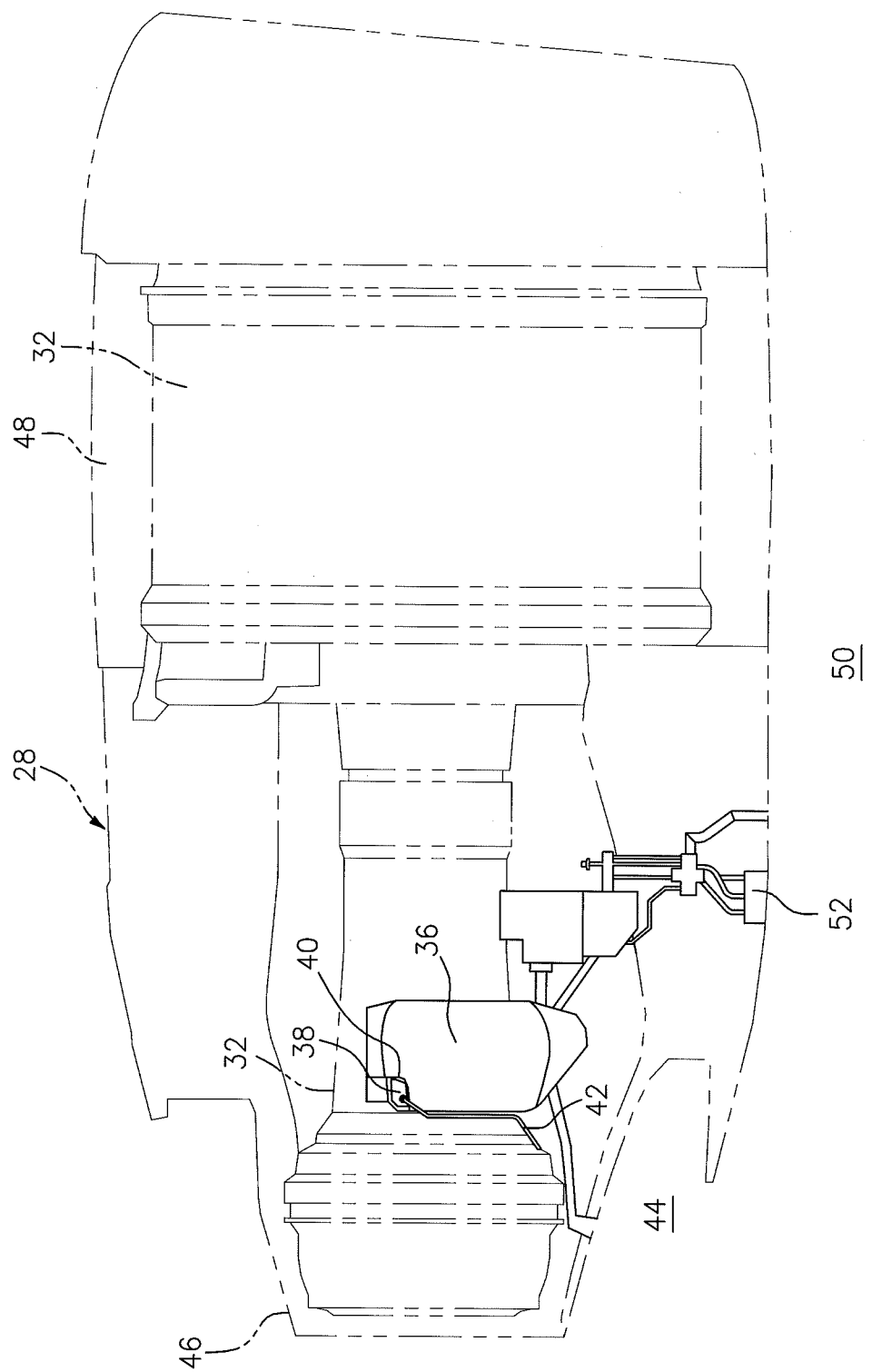
FIG. 2 is a view within the nacelle to illustrate the gas turbine engine therein.
Figure 3:
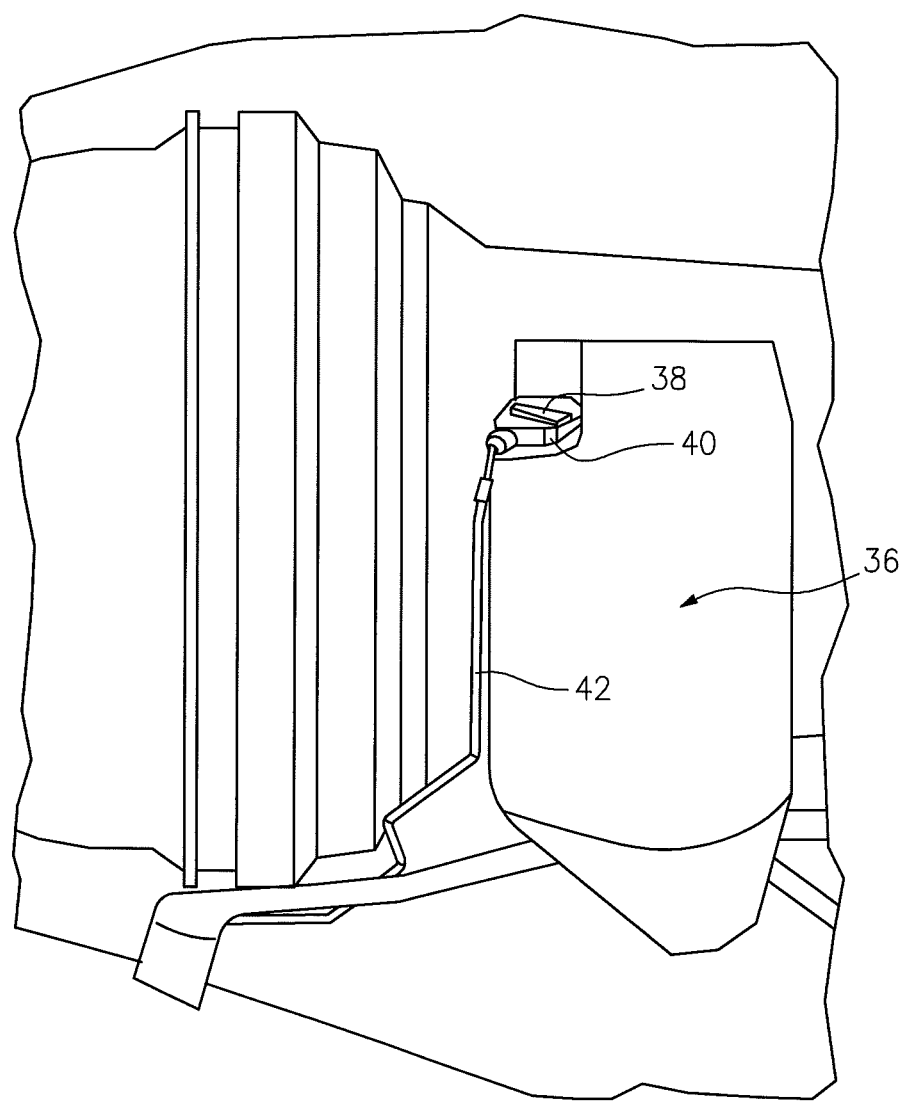
FIG. 3 is an expanded view within the nacelle to illustrate an oil tank mounted to a case of the gas turbine engine therein.

With reference to FIG. 2, an oil tank 36 is mounted adjacent to the turbine case 32 within the nacelle assembly 28. The oil tank 36 generally includes a cap assembly 38, a scupper bowl 40 and an oil scupper drain line 42 (also shown in FIG. 3). The scupper bowl 40 surrounds the cap assembly 38 such that excess oil from a "fill to spill" maintenance operation is contained within the scupper bowl 40 then drains through the oil scupper drain line 42. The oil scupper drain line 42 vents through a core nacelle 46 into a fan bypass airflow 44. The fan bypass flow 44 is generally between the core nacelle 46 and a fan nacelle 48. The oil scupper drain line 42 vents into the fan bypass flow 44 in contrast to ambient condition "free stream" airflow 50 to which a drain mast 52 typically vents. It should be appreciated that various drain arrangements may alternatively be provided.

Figure 4:
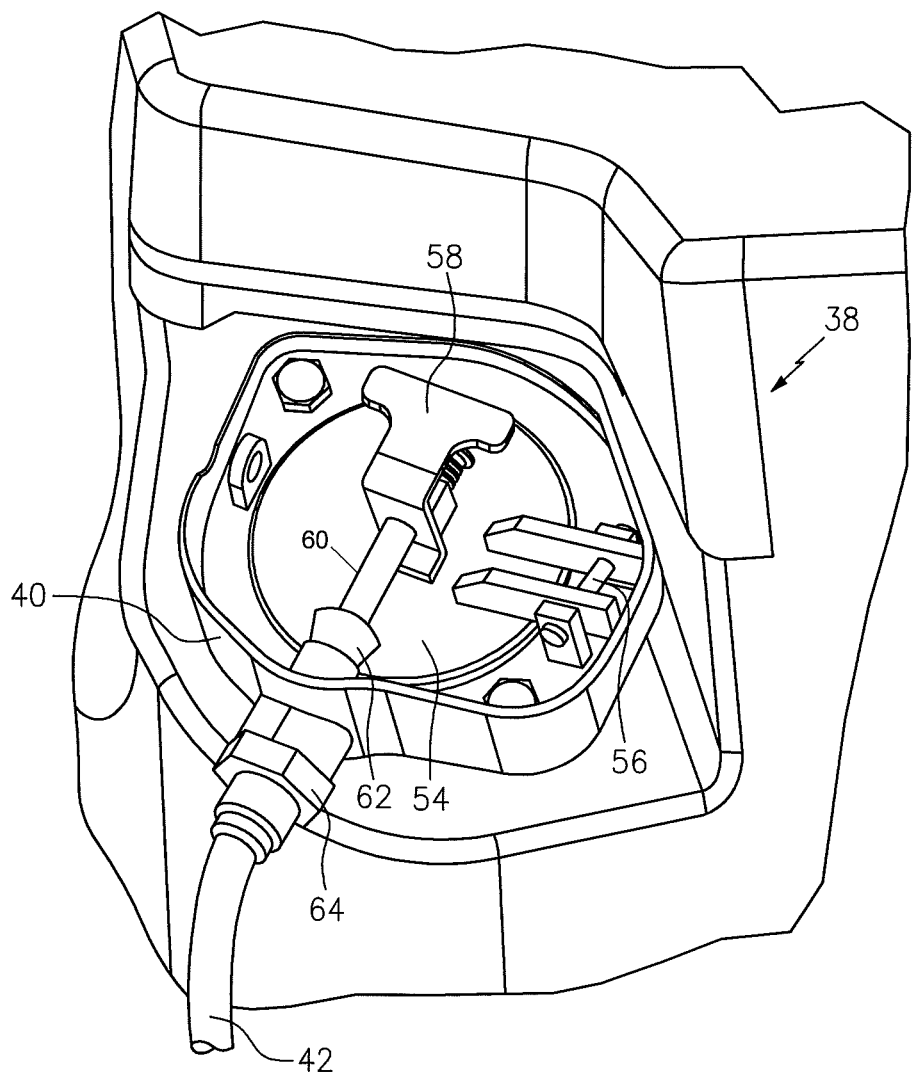
FIG. 4 is an expanded view of a cap assembly and scupper of the oil tank.
Figure 5:
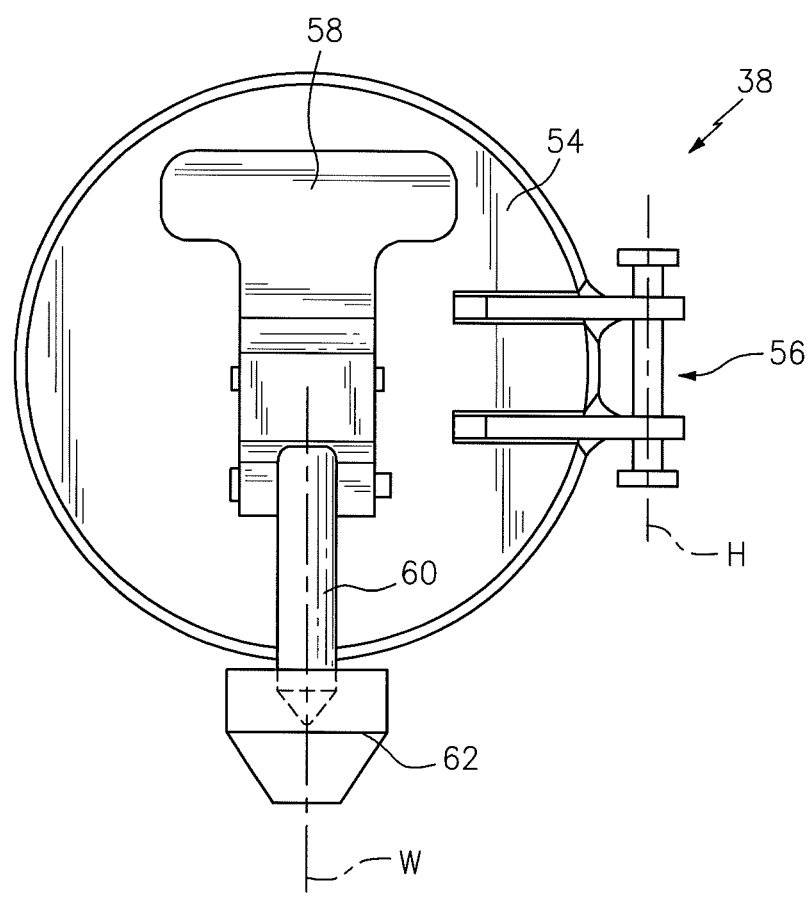
FIG. 5 is a top view of the cap assembly.

With reference to FIG. 4, the cap assembly 38 generally includes a cap 54, a hinge 56, a latch 58, a retainer pin 60 and a plunger 62 mounted to the retainer pin 60 (also shown in FIG. 5). Articulation of the latch 58 retracts the retainer pin 60 and permits the cap 54 to articulate open. It should be understood that various mechanisms may be utilized to retract the retainer pin 60 along a pin axis W in response to articulation of the latch 58. That is, the latch 58 may be lifted to retract the retainer pin 60 and be spring-loaded to a locked position with the retainer pin 60 extended along its axis W. In one disclosed non-limiting embodiment, the pin axis W is parallel to a hinge axis H of the hinge 56 and the latch 58 is spring loaded to the locked position at which the retainer pin 60 is extended. The hinge 56 may permit significant range, such as an approximately 110 degree rotational range to facilitate oil can fill access.

The scupper bowl 40 surrounds the cap assembly 38. The oil scupper drain line 42 connects to the scupper bowl 40 through a fitting 64 in which the plunger 62 is received. That is, the retainer pin 60 and plunger 62 both locks the cap 54 closed as well as seals the oil scupper drain line 42. The plunger 62 may be frustroconical in shape and fit at least partially over the retainer pin 60. The plunger 62 may also be manufactured of a resilient material to securely seal with the fitting 64 opposite the oil scupper drain line 42.

The plunger 62 readily seals the fitting 64 when the cap 38 is closed and the latch 58 is articulated. The plunger 62 seals the oil scupper drain line 42 such that even if a small delta pressure exists between the oil scupper drain line 42 and within the nacelle assembly 28, any residual oil within the oil scupper drain line 42 is trapped therein.

The oil scupper drain line 42 may thereby exit the nacelle assembly 28 at any desired location without concern for residual oil in the oil scupper drain line 42 being purged back into the nacelle assembly 28.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A cap assembly, comprising:
   a cap;
   a retainer pin for said cap;
   a plunger mounted to said retainer pin;
   a latch operable to retract said retainer pin; and
   a hinge having a hinge axis,
   wherein said retainer pin is configured to be retracted along an axis parallel to the hinge axis.

2. The cap assembly as recited in claim 1, wherein said plunger is manufactured of resilient material.

3. The cap assembly as recited in claim 1, wherein said plunger is frustroconical.

4. The cap assembly as recited in claim 1, wherein said latch is spring loaded.

5. A tank for a gas turbine engine, comprising:
   a cap;
   a scupper bowl that surrounds said cap;
   an oil scupper drain line connected to said scupper bowl at a fitting; and
   a retainer pin with a plunger, said retainer pin movable along an axis with respect to said cap, said plunger selectively received within said fitting to lock said cap and seal said oil scupper drain line.

6. The tank as recited in claim 5, wherein, said tank is an oil tank.

7. The tank as recited in claim 5, wherein said cap is hinged to said tank along a hinge axis.

8. The tank as recited in claim 6, wherein said hinge axis is parallel to said retainer pin.

9. The cap assembly as recited in claim 1, wherein said latch is operable to cause said retainer pin to retract away from said cap when an oil can associated with said cap assembly is filled.

10. The cap assembly as recited in claim 1, wherein said hinge is operable to rotate over approximately a 110 degree rotational range.

* * * * *